United States Patent [19]
Foss et al.

[11] Patent Number: 5,956,855
[45] Date of Patent: Sep. 28, 1999

[54] LADDER INCLINATION INDICATOR

[75] Inventors: Albert J. Foss, 61 Barkhamsted Rd., West Granby, Conn. 06090; William F. Lytle, Woodbridge, Conn.

[73] Assignee: Albert J. Foss, W. Granby, Conn.

[21] Appl. No.: 08/808,308

[22] Filed: Feb. 28, 1997

[51] Int. Cl.⁶ .................................................. G01C 9/12
[52] U.S. Cl. ............................. 33/391; 33/333; 33/347; 33/371
[58] Field of Search .......................... 33/391, 333, 347, 33/370, 371

[56] References Cited

U.S. PATENT DOCUMENTS

| | | | |
|---|---|---|---|
| 2,845,719 | 8/1958 | Thomiszer | 33/333 |
| 3,118,234 | 1/1964 | Wilson | 33/371 |
| 4,669,195 | 6/1987 | Griffin | 33/391 |
| 5,058,283 | 10/1991 | Wise et al. | 33/333 |
| 5,063,679 | 11/1991 | Schwandt | 33/370 |
| 5,680,707 | 10/1997 | Boelling | 33/391 |

*Primary Examiner*—Christopher W. Fulton
*Attorney, Agent, or Firm*—McCormick, Paulding & Huber

[57] ABSTRACT

A ladder inclination indicator has a transparent thin-walled body shell defining a rearwardly open recess containing a pivot pin supporting a gravity actuated pointer. A keeper plate forms a partial closure for the recess and carries a label which cooperates with the pointer to indicate a position of ladder inclination. Layers of pressure sensitive adhesive adhered to mounting flanges on the body shell secure the device to the side rail of a ladder.

17 Claims, 2 Drawing Sheets

LADDER INCLINATION INDICATOR

BACKGROUND OF THE INVENTION

This invention relates in general to ladder safety devices and deals more particularly with an improved device for indicating whether a straight ladder is positioned at a safe angle of inclination when the ladder is leaning against a building or other supporting structure. Accidents involving straight ladders often result in serious injury. Such accidents can often be attributed to improper ladder positioning. Safety authorities generally agree that the ideal angle of inclination for a straight ladder is about 70 degrees to the horizontal with a plus or minus tolerance of about 5 degrees. However, uneven ground conditions are often encountered which make it difficult to attain ideal positioning without the use of some type of ladder leveling device not usually readily available to the average home owner or other occasional ladder user. Consequently, the ladder user may attempt to compensate for a difficult terrain condition, and in so doing, may unknowingly position the ladder at an unsafe angle of inclination, thereby setting the stage for a potentially serious accident.

Heretofore ladder inclination devices have been provided to aid the occasional ladder user in properly positioning a ladder at a safe angle of inclination. Typical examples of such devices are found in the following U.S. Pat. No.

| 2,845,719 | Thomiszer |
| 3,118,234 | Wilson |
| 4,554,994 | Weiner |

It appears that those devices heretofore available have not gained widespread acceptance, which may be attributed in the cost of producing such a device or the difficulty encountered in affixing the device to an associated ladder.

Accordingly, it is the general aim of the present invention to provide an improved ladder inclination device for low cost production and which may be readily affixed to an associated ladder without the use of tools.

SUMMARY OF THE INVENTION

In accordance with the present invention an improved ladder inclination indicator is provided which includes an indicator body and an axially elongated pivot member integrally connected to and projecting outwardly in cantilever position from the indicator body. A gravity actuated indicating member is supported on the pivot member for pivotal movement relative to the indicator body. Display means carried by the indicator body cooperate with the indicating member to indicate an inclined condition of an associated ladder when the ladder inclination indicator is mounted in a predetermined positioned on a side rail of an associated ladder. Mounting means adhered to the indicator body secure the ladder inclination indicator to the side rail of the associated ladder.

DETAILED DESCRIPTION OF PREFERRED EMBODIMENT

Figure 1:
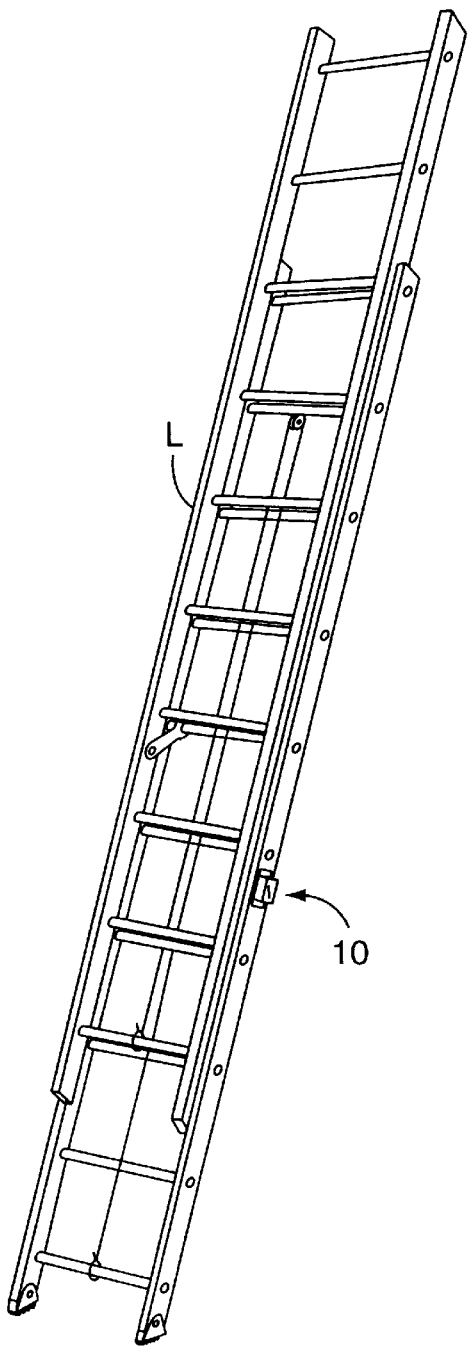
FIG. 1 is a perspective view of an inclined extension ladder having a ladder inclination indicator embodying the present invention mounted on a side rail thereof.

Turning now to the drawings a ladder inclination indicator embodying the present invention and designated generally by the reference numeral 10 is shown secured to the side rails of an associated ladder designated by the letter L and shown in FIG. 1 in an inclined position. The illustrated ladder inclination indicator 10 essentially comprises an indicator body generally indicated at 12 and an axially elongated support member or pivot pin 14 integrally connected to and projecting axially outward from the indicator body 10. The inclination indicator 10 further includes a gravity actuated indicating member 16 supported on the pivot member 14 for pivotal movement relative to the indicator body. A display indicated generally at 18 and carried by the indicator body 12 cooperates with the indicating member 16 to indicate a condition of ladder inclination. The inclination indicator 10 further includes mounting means indicated generally at 20, 20 for securing the ladder inclination indicator 10 to the side wall of an associated ladder, all of which will be hereinafter more fully discussed.

Figure 2:
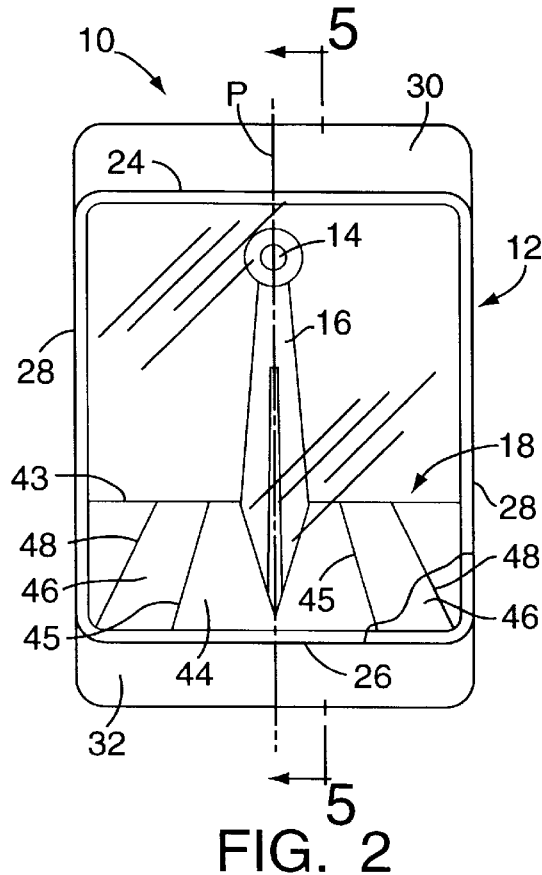
FIG. 2 is front elevational view of the ladder inclination indicator shown in FIG. 1.
Figure 3:
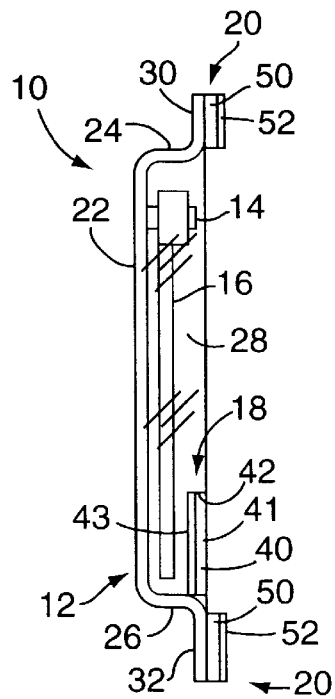
FIG. 3 is a side elevational view of the ladder inclination indicator.

Considering now the inclination indicator 10 in further detail and referring particularly to FIGS. 2–5, the presently preferred indicator 10 is symmetrical relative to a vertical plane containing the axis of the pivot pin 14 and indicated by the letter P in FIG. 2. The indicator body 12 preferably comprises a transparent relatively thin-walled indicator shell molded from a durable plastic material. The indicator shell 12 has a generally rectangular front wall 22, a top wall 24, a bottom wall 26, and a pair of opposing side walls 28, 28. Upper and lower end flanges 30 and 32 extend outwardly from the upper and lower end walls 24 and 26, respectively, and define rearwardly facing mounting surfaces 34 and 36 which lie within a common plane.

Figure 4:
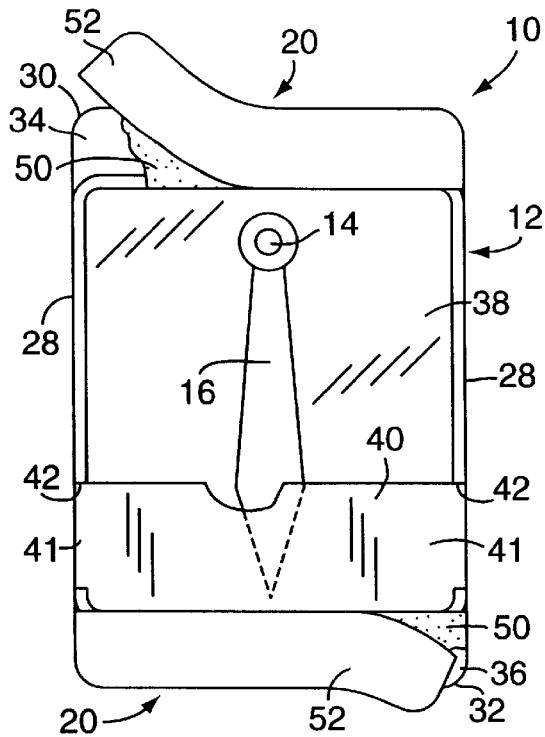
FIG. 4 is a rear view of the ladder inclination indicator.
Figure 5:
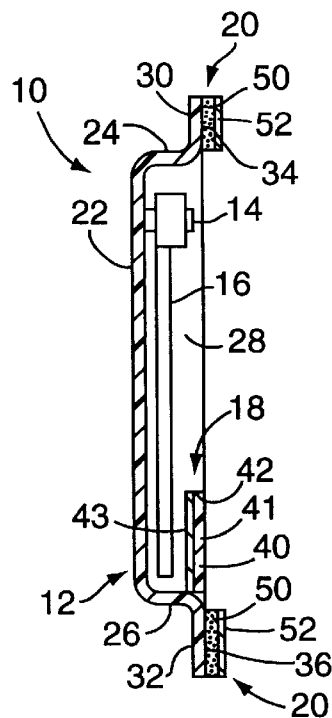
FIG. 5 is a sectional view taken along the line 5—5 of FIG. 2.

The indicator shell 12 defines a shallow rearwardly open recess 38, as best shown in FIGS. 4 and 5. The pivot pin 14 is wholly disposed within the recess 38 and may be formed as an integral part of the indicator shell 12 substantially as shown or may be otherwise integrally connected to the indicator body within the recess 38. More specifically, the pivot pin 14, which is preferably generally cylindrical, projects in a cantilever position from the rear surface of the front wall 22 near the upper end of the recess 38 midway between the side walls 28, 28, substantially as shown in FIGS. 2 and 4.

The indicating member 16 may take various forms and may be made from any suitable material, but preferably, and as shown, it comprises a pointer molded from a durable plastic material and having a pivot bushing at its upper end. The pivot bushing supports the pointer on the pivot pin 14 to depend from the pivot pin for pivotal movement relative to the indicator body within the recess 38.

In accordance with presently preferred construction, a keeper plate 40 provides a partial closure for the rearwardly open recess 38 and cooperates with the pivot pin 14 to retain the pointer 16 within the recess 38. The keeper plate 40 which comprises a part of the indicator body 12 has tabs 41,41 at its opposite ends which are respectively received within complimentary notches 42, 42 formed in the body shell side walls 28, 28. The keeper plate is preferably adhesively attached or otherwise secured to the transparent body shell.

The display 18 which cooperates with the pointer 16 may comprise indicia of ladder inclination imprinted directly on the frontal surface of the keeper plate 40, but preferably, and as shown, the display comprises a label 43 having indicia of ladder inclination imprinted thereon and affixed to the frontal surface of the latter plate within the recess 38.

Referring now particularly to FIG. 2, the label 43 is divided into a plurality of separate zones along radial lines of demarcation on the label centered at the pivotal axis of the pointer indicator 16. A central zone is printed in one color, preferably red to signify a danger area, and indicated by the numeral 44. The central region 44 is bounded by two radially extending lines of demarcation 45, 45 subtending an angle of approximately 30 degrees about the pivot pin axis. The illustrated label 43 further includes two other regions 46, 46, each contiguous to the central region 44 and each subtending an angle of about 10 degrees. The regions 46, 46 are further defined by radiating lines of demarcation 48, 48 centered at the axis of the pointer 16, substantially as shown in FIG. 2. The regions 46, 46 are printed in another color, preferably green to designate safe zones. The remaining portions of the label outward of and contiguous to the regions 46, 46 are or may be imprinted in the same color as the central portion 44, namely red.

Preferably, and as shown, strips of double sided pressure sensitive adhesive 50, 50 are adhered to the rearwardly facing mounting surfaces 34 and 36 on the mounting flanges. Each strip of pressure sensitive adhesive is covered by a complimentary strip of release paper 52 or other suitable release material which protects the otherwise exposed tacky surface of the pressure sensitive adhesive until the indicating device 10 is ready to be affixed to the side rail of a ladder, such as the letter L.

Preparatory to affixing the ladder inclination indicator 10 to the side rail of a ladder, the release paper strips 52, 52 are stripped from the mounting surfaces to expose the tacky surfaces of pressure sensitive adhesive 50, 50. The indicating device 10 is preferably affixed to the ladder side rail at about eye level. A side edge of one of the side walls 28 serves as a reference for aligning the indicating device with the major axis of the ladder. More specifically, an edge of one of the side walls 28, 28 is aligned in parallel relation with an associated edge of a ladder side rail after which the indicating device is affixed to the side rail by the strips of pressure sensitive adhesive 50, 50. Since the indicating device 10 is symmetrical about the axial plane P it will be evident that the device may be mounted on either side rail of the ladder L.

Figure 6:
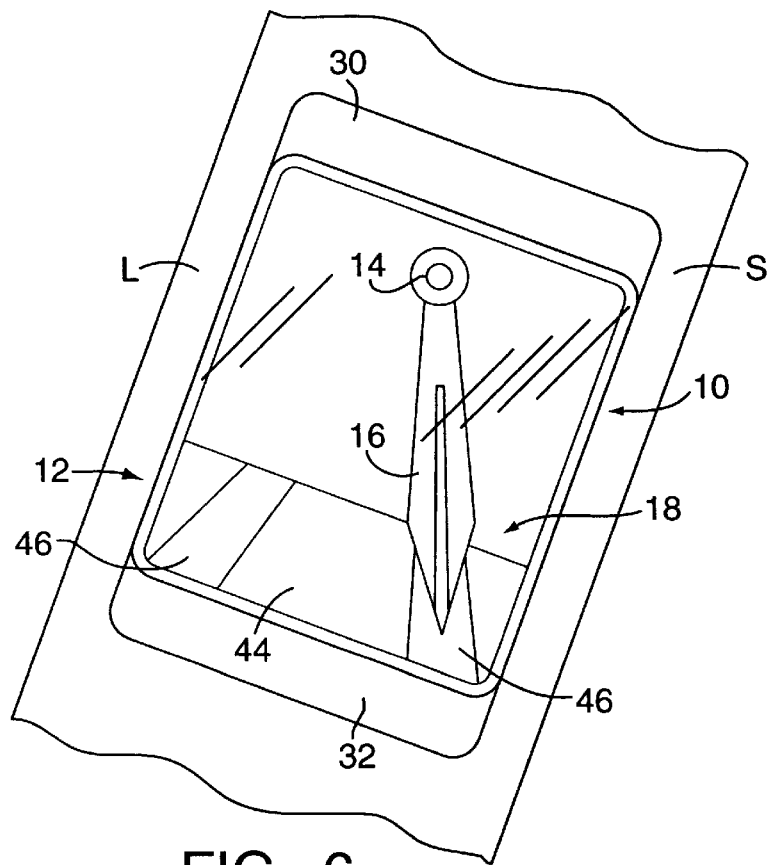
FIG. 6 is a fragmentary front elevational view of a ladder inclination indicator attached to the side rail of a ladder shown in an inclined position.

In FIG. 6 the ladder inclination indicator 10 is shown properly attached to the right hand side rail S of the ladder L, as it appears in FIG. 1. The ladder L is shown in FIG. 6 in an inclined position. The gravity actuated pointer 10 is disposed centrally of the green zone 46 (the safe zone) at the right of the label 43, which indicates that the ladder L is positioned at a proper angle of inclination for safe use. In addition to showing the ladder user that the ladder is inclined at a safe angle for use, the presence of the indicator 10 on the ladder serves as a constant reminder to the ladder user that all safety precautions required for safe ladder usage should be observed.

We claim:

1. A ladder inclination indicator comprising a transparent thin-walled indicator body shell defining a recess and having an opening therein, said body including a keeper plate forming a partial closure for said opening, an axially elongated pivot member contained within said recess integrally connected to and projecting in axially cantilever position from said indicator body, a gravity actuated indicating member contained within said recess and supported by said pivot member for pivotal movement relative to said indicator body, said keeper plate cooperating with said pivot member to retain said indicating member within said recess display means carried by said indicator body for cooperating with said indicating member to indicate an inclined condition of a ladder when the ladder inclination indicator is mounted in a predetermined position on the ladder, and attaching means carried by said indicator body for securing said ladder inclination indicator to a side rail ladder.

2. A ladder inclination indicator as set forth in claim 1 wherein said ladder inclination indication is symmetrical about an axial plane of said pivot member passing through said display means.

3. A ladder inclination indicator as set forth in claim 1 wherein said display means comprises indicia of ladder inclination.

4. A ladder inclination indicator as set forth in claim 3 wherein said display means comprises a label attached to said indicator body and said indicia of ladder inclination is imprinted on said label.

5. A ladder inclination indicator as set forth in claim 3 wherein said indicia of ladder inclination includes a central zone imprinted in one color and two outer zones forming boundaries of said central zone and imprinted in another color.

6. A ladder inclination indicator as set forth in claim 5 wherein said central zone subtends an angle of 30 degrees centered at the pivot axis of said pivot member and each of said two outer zones subtends an angle of ten degrees centered at said pivot axis.

7. A ladder inclination indicator as set forth in claim 1 wherein said display means comprises a label affixed to said keeper plate within say recess.

8. A ladder inclination indicator as set forth in claim 7 wherein said display means includes indicia of ladder inclination imprinted on said label.

9. A ladder inclination indicator as set forth in claim 1 wherein said attaching means comprises a layer of pressure sensitive adhesive adhered to said indicator body and a layer of release material overlying said layer of pressure sensitive adhesive.

10. A ladder inclination indicator as set forth in claim 9 wherein said indicator body has a flange thereon and said layer of pressure sensitive adhesive is adhered to said flange.

11. A ladder inclination indicator as set forth in claim 1 wherein said indicating member has a free end remote from said pivot member and said free end cooperates with said keeper plate to retain said indicating member within said recess.

12. A ladder inclination indicator comprising a hollow thin-walled indicator body shell defining a rearwardly open recess, a pair of mounting flanges integrally connected to the indicator body shell and projecting outwardly in opposite direction from the body shell, a cylindrical pivot pin integrally connected in a cantilever position to the body shell within the recess, a gravity actuated pointer pivotally supported on the pivot pin and wholly disposed within the recess, a keeper plate mounted at the rear of the body shell and forming a partial closure for said rearwardly open recess, said keeper plate cooperating with said pivot pin to retain said pointer within said recess, and display means on said keeper plate and within said recess for cooperating with said pointer to indicate the inclination of a ladder to which the ladder inclination indicator is attached.

13. A ladder inclination indicator as set forth in claim 12 wherein said display means comprises a label attached to the frontal surface of said keeper plate within said recess and having said indicia of ladder inclination imprinted thereon.

14. A ladder inclination indicator as set forth in claim 12 including attaching means for securing said indicator to the side rail of an associated ladder.

15. A ladder inclination indicator as set forth in claim 14 wherein said attaching means comprises pressure sensitive adhesive adhered to said indicator body and release material overlying said pressure sensitive adhesive.

16. A ladder inclination indicator as set forth in claim 14 wherein said body has mounting flanges thereon having mounting surfaces disposed within a common plane and said attaching means comprises layers of pressure sensitive adhesive carried by said mounting surfaces and release material overlying said layers of pressure sensitive adhesive.

17. A ladder inclination indicator as set forth in claim 12 wherein said pointer has a free end and said keeper plate cooperates with said free end to retain said pointer within said recess.

* * * * *